(12) United States Patent
Maire et al.

(10) Patent No.: US 10,125,625 B2
(45) Date of Patent: Nov. 13, 2018

(54) GAS TURBINE ENGINE COMPONENT WITH PERFORMANCE FEATURE

(71) Applicant: Siemens Energy, Inc., Orlando, FL (US)

(72) Inventors: David G. Maire, Winter Springs, FL (US); Daniel J. Ryan, Oviedo, FL (US); Dhafer Jouini, Orlando, FL (US); Ahmed Kamel, Orlando, FL (US); Gerald J. Bruck, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 435 days.

(21) Appl. No.: 14/816,156

(22) Filed: Aug. 3, 2015

(65) Prior Publication Data

US 2017/0037739 A1    Feb. 9, 2017

(51) Int. Cl.
*F01D 11/00* (2006.01)
*F01D 25/16* (2006.01)
*F01D 11/12* (2006.01)

(52) U.S. Cl.
CPC .......... *F01D 11/003* (2013.01); *F01D 11/122* (2013.01); *F01D 25/166* (2013.01); *F05D 2240/55* (2013.01); *F05D 2260/311* (2013.01); *F05D 2260/80* (2013.01); *F05D 2270/11* (2013.01)

(58) Field of Classification Search
CPC . F01D 11/125; F01D 5/282; F05D 2300/6111
USPC .......................................................... 416/2
See application file for complete search history.

(56) References Cited

U.S. PATENT DOCUMENTS

| 4,233,926 | A |  | 11/1980 | Rogers et al. |
| 5,112,194 | A | * | 5/1992 | More .................... F04D 29/324 415/174.4 |
| 6,002,560 | A |  | 12/1999 | Nguyen et al. |
| 6,681,558 | B2 | * | 1/2004 | Orlando .................. F01D 9/041 60/204 |
| 6,932,891 | B2 |  | 8/2005 | Wigg et al. |
| 6,957,622 | B2 |  | 10/2005 | Boettcher et al. |
| 7,165,708 | B2 |  | 1/2007 | Motono et al. |
| 7,278,519 | B2 |  | 10/2007 | Iwai et al. |
| 7,837,199 | B2 | * | 11/2010 | Craig .................... F01D 11/003 277/370 |
| 7,847,679 | B2 |  | 12/2010 | Copeland et al. |
| 8,113,787 | B2 | * | 2/2012 | Barril ..................... F01D 5/288 416/224 |
| 8,540,936 | B2 |  | 9/2013 | Hefner et al. |
| 8,571,813 | B2 |  | 10/2013 | Johnston |

(Continued)

OTHER PUBLICATIONS

Yaghoubi, M. and S. Mahmoodi (2004).Experimental study of turbulent separated and reattached flow over a finite blunt plate. Experimental Thermal and Fluid Science 29, p. 105-112).*

*Primary Examiner* — Jason Shanske
*Assistant Examiner* — Topaz L Elliott

(57) ABSTRACT

A gas turbine engine component (50, 100, 150, 160, 174, 206, 236), including: a surface (54) subject to loss caused by a wear instrument during operation of the component in a gas turbine engine and a performance feature (80, 82, 102, 152, 162, 172, 200, 230) associated with the surface. The surface and the performance feature interact in a manner that changes with the loss such that a change in performance of the gas turbine engine resulting from the loss is mitigated.

8 Claims, 7 Drawing Sheets

(56) References Cited

U.S. PATENT DOCUMENTS

| | | | |
|---|---|---|---|
| 8,695,527 B2 | 4/2014 | Edmond | |
| 8,746,049 B2 | 6/2014 | Willett, Jr. et al. | |
| 8,770,913 B1 | 7/2014 | Negron et al. | |
| 8,818,078 B2 | 8/2014 | Telfer et al. | |
| 9,624,781 B2 * | 4/2017 | Czerner | F01D 5/288 |
| 9,752,780 B2 * | 9/2017 | Jones | F23R 3/002 |
| 2004/0037619 A1 | 2/2004 | Brunneke et al. | |
| 2004/0222084 A1 | 11/2004 | Wigg et al. | |
| 2011/0138951 A1 | 6/2011 | Mashue et al. | |
| 2013/0136868 A1 | 5/2013 | Bruck et al. | |
| 2015/0000288 A1 * | 1/2015 | Jones | F23R 3/002 60/754 |
| 2015/0003990 A1 * | 1/2015 | Czerner | F01D 5/282 416/229 R |

\* cited by examiner

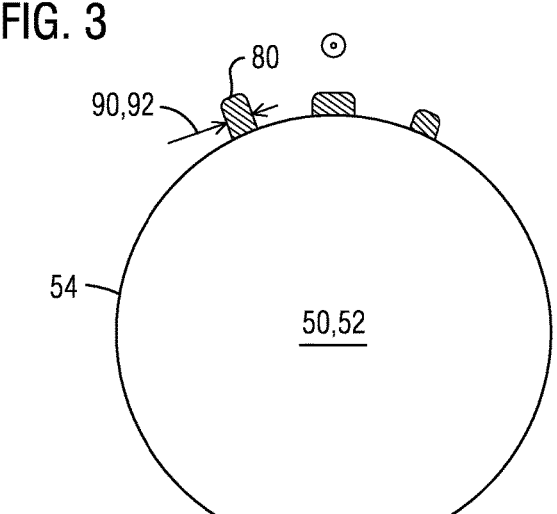
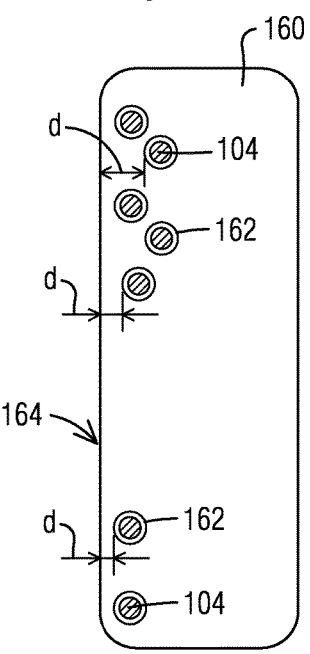
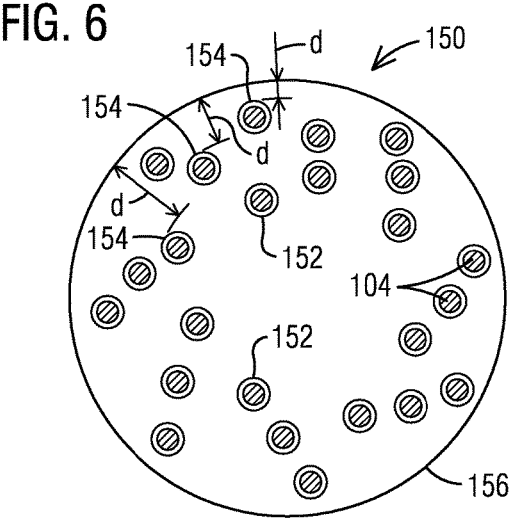

GAS TURBINE ENGINE COMPONENT WITH PERFORMANCE FEATURE

FIELD OF THE INVENTION

The invention relates generally to a gas turbine engine component, and more particularly to a component with a performance feature that mitigates a change in performance associated with a loss of component material.

BACKGROUND OF THE INVENTION

Components having surfaces subject to wear during operation may need to be monitored during operation to ensure that an amount of wear does not exceed a threshold amount of permitted wear. Various arrangements and methods have been implemented to permit visual inspection of the wear. For example, markers have been embedded in the component material below the surface subject to wear. These markers may initially be visible, or they may be covered by the component material. As the component material wears the surface of the component moves until it reaches the marker. In some arrangements the marker may be characterized by a parameter that is different from the component material so that it is readily distinguishable from the component material. For example, the marker may exhibit a different color, making it readily identifiable. The marker may exhibit a different shape, or wear resistance. Upon further wear of the component material the surface and the marker typically wear together, and the different parameter may become more pronounced. For example, markers may exhibit more color, or different colors with increased wear.

Similarly, a marker's shape or its effect may become more pronounced with further wear. U.S. Pat. No. 7,278,519 to Iwai et al. discloses a brake having a first, softer material, and a second, harder material. The second material is a marker material that generates noise, indicating a certain level of wear. Further wear exposes more of the second, harder material, and hence generates more noise.

In a variation of the common arrangements, U.S. Pat. No. 6,932,891 to Wigg et al. discloses a marker becomes exposed upon loss of anode material, but is not lost as the anode material is lost.

However, due to the wide range of applicable uses and changing technologies, there remains room in the art to improve marker functionality.

BRIEF DESCRIPTION OF THE DRAWINGS

The invention is explained in the following description in view of the drawings that show:

FIG. 3 is a different schematic view of the performance feature of FIG. 2.

FIG. 6 is a schematic sectional view of an exemplary embodiment of a round bearing having embedded performance features.

FIG. 7 is a schematic side sectional view of an exemplary embodiment of a flat bearing having embedded performance features.

DETAILED DESCRIPTION OF THE INVENTION

Conventional wear indicators (a.k.a. markers) indicate an amount of loss of a component material. This loss is often caused by surface wear and/or corrosion etc., and is typically associated with a surface of the component material being worn. For example, as a seal material of a seal element wears a surface of the seal element may recede and expose the marker material. The surface of the material subject to wear typically provides a function. In the case of the seal element, the seal element surface provides a sealing surface that, together with a sealing surface of an adjacent component, defines a seal. As the seal material wears the seal surface changes. This reduces a quality/performance of the seal provided in part by the seal surface.

The present inventors have recognized that the role of wear indicators (a.k.a. markers) can be expanded from that of a simple marker to include performing a function once exposed. The function performed by the feature can be chosen so that it relates to or is the same as the function performed by a surface whose loss is being indicated by the feature, particularly where the function performed by the surface changes as the surface wears. Once exposed, the performance feature can slow the change associated with the material loss, and/or it can cure the change associated with the material loss while also indicating the loss. The dual-role performance features can be used to indicate loss in components having material subject to loss of any sort (e.g. wear, via chemical reaction etc.) and can perform a wide range of functions.

Numerous components within a gas turbine engine set the boundaries for a flow of a hot gas path through the engine. Many of these components are also designed to create an aerodynamic action within the flow of hot gases (i.e. interact with the flow to create the aerodynamic action). A non-limiting example of an aerodynamic action includes setting/anchoring a point where the flow of hot gases separates from a surface of the component. For example, the flow of hot gases may separate from a stationary vane or a rotating blade platform or a suction side of an airfoil at a certain location and the surface of the component may be designed to ensure that separation location is as-desired. The surface of the component may also set/anchor a location where vortexes form in the flow of hot gases. The surface may be designed to position the vortex so that it coincides with downstream components such as downstream vanes as desired. The surface of the component may locally redirect the flow of hot gases over or around an aerodynamically undesirable feature such as the leading edge of a platform etc. Numerous examples exist where the surface of the component performs this dual-role.

Figure 1:
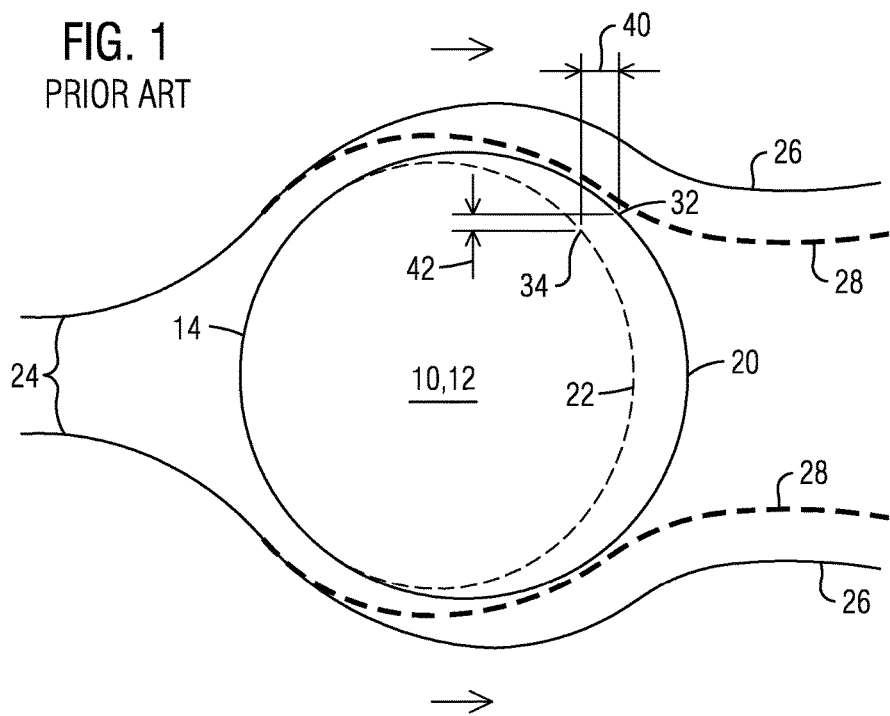
FIG. 1 is a schematic view of a prior art change in an aerodynamic action due to loss of component material.

FIG. 1 shows a schematic of a prior art component 10 composed of a component material 12 subject to loss and defining a component surface 14 subject move as a result of the loss. In general, loss may be from any or all of mechanical loss/wear due to a wear instrument, spallation, and via chemical deterioration. The wear instrument may be anything that causes mechanical loss/wear. For example, in this exemplary embodiment the wear instrument may be the flow of hot gases. Alternately, or in addition, the wear instrument may be an adjacent component that physically contacts the component surface 14 and causes frictional wear, such as a sealing or bearing surface.

The solid line represents an initial contour 20 of the prior art component 10, and a dotted line represents a worn contour 22 of the prior art component 10 after an amount of loss. Streamlines 24 represent a path taken by hot gases approaching the prior art component 10. Solid streamlines represent an initial contour path 26 taken by the hot gases around the prior art component 10 when the initial contour 20 is present. Dotted streamlines represent a worn contour path 28 taken by the hot gases around the prior art component 10 when the worn contour 22 is present.

Initial separation location 32 represents a location where the initial contour path 26 separates from the prior art component 10 when the initial contour 20 is present. Worn separation location 34 represents a location where the worn contour path 28 separates from the prior art component 10 when the worn contour 22 is present. From this it can be seen that the flow of hot gases separates from the prior art component at a location that changes as component material 12 is lost and the component surface 14 moves. When the component surface 14 is contoured in three dimensions, the change may include an x-axis component 40, a y-axis component 42, and a z-axis component (not shown).

In some arrangements the initial separation location 32 is selected in order to optimize engine performance. Consequently, the loss-induced change in the separation location may result in a loss of engine performance. Markers known in the prior art would simply indicate the amount of material loss. Since engine performance change is associated with the loss of component material, operators would know where a component stood in terms of its component life by looking at the markers. If the marker indicated that the component was at or near the end of its life, the component could be replaced.

The inventors, however, have devised an arrangement where the marker not only indicates loss, but where the marker has an addition role of performing a function designed to slow or cure the change associated with the material loss.

Figure 2:
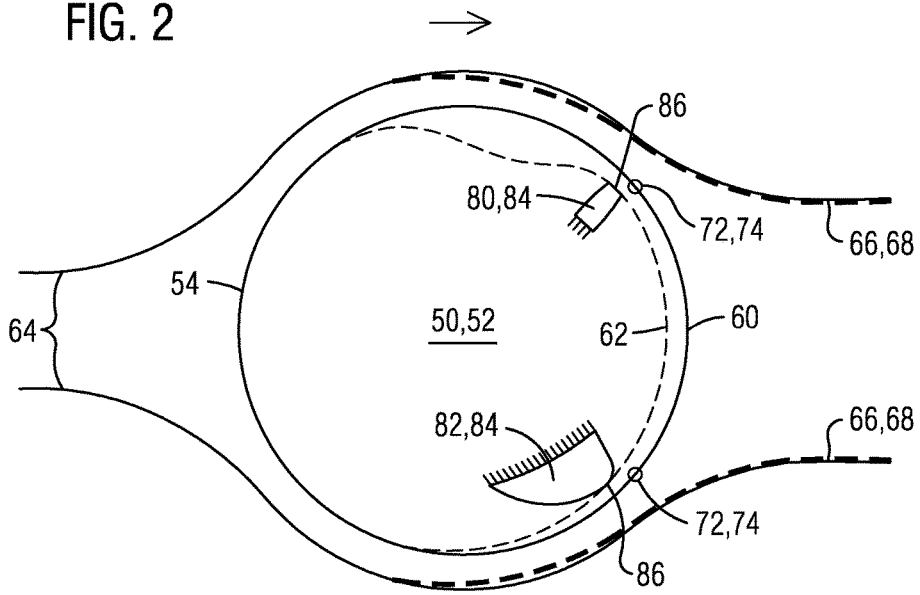
FIG. 2 is a schematic view of an exemplary embodiment of performance features mitigating the change in the aerodynamic action despite loss of the component material.

FIG. 2 shows a schematic of an exemplary embodiment of a component 50 having a component material 52 subject to loss and defining a component surface 54 subject move as a result of the loss. The solid line represents an initial contour 60 of the component 50, and a dotted line represents a worn contour 62 of the component 50 after an amount of loss. Streamlines 64 represent a path taken by hot gases approaching the component 50. Solid streamlines represent an initial contour path 66 taken by the hot gases around the component 50 when the initial contour 60 is present. Dotted streamlines represent a worn contour path 68 taken by the hot gases around the component 50 when the worn contour 62 is present.

Initial separation location 72 represents a location where the initial contour path 66 separates from the component 50 when the initial contour 60 is present. Worn separation location 74 represents a location where the worn contour path 68 separates from the component 50 when the worn contour 62 is present. From this it can be seen that the initial separation location 72 and the worn separation location 74 are the same or are very close to each other despite a change in the contour of the component 50 associated with the loss of the component material 52 and the change in location of the component surface 54. It is understood that the initial contour path 66 and the worn contour path 68 may vary at other locations. If this is not a concern it may be permitted. Alternately, other performance features may be used as necessary to control the other variations.

In this exemplary embodiment the separation location is anchored by a plurality of performance features 80, 82, each being at least partially embedded in the component material 52. The performance features 80, 82 may be composed of a feature material 84 that is more resistant to loss due to the flow of hot gases than the component material 52. Accordingly, as the component material 52 wears the performance features 80, 82 become more exposed. With continued loss of the component material 52 the performance features 80, 82 increasingly project above the component surface 54. The flow of hot gases would normally follow the surface contour, and the separation location would normally change with the contour, but the performance features 80, 82 are selected such that, once exposed, they anchor the separation location 72, 74. Accordingly, the separation location 72, 74 does not follow the eroding component surface 54, but instead stays in the desired location.

It is also understood that it may be desirable to permit a controlled rate of movement of the separation location, but at a rate that is different from a rate the separation location would move due to loss of the component material 52. In this instance a relatively more wear resistant component material 52 could be selected such that it experiences loss due to the flow of hot gases, but does so at a rate that is less than that of the relatively less wear resistant component material. Likewise, it is contemplated that it may be desirable to permit an amount of movement of the separation location that is less than would occur due to loss of the component material. In this instance the performance features 80, 82 may be embedded such that a top 86 of the performance feature 80, 82 is not flush with the component surface 54 at the initial contour 60, but is instead disposed beneath the component surface 54 initially, and only becomes exposed when it is deemed the performance features 80, 82 should take over the role of anchoring the separation location.

The performance features 80, 82 may take on any number of sizes and shapes and may be distributed in any pattern. For example, more performance features 80, 82 may be located where more loss is expected. Alternately, or in addition, the size of the performance feature 80, 82 may be varied as desired and the performance features may be disposed on the component surface 54 (via welding or adhesive etc.) as shown in FIG. 3. For a relatively simple, post-shaped performance feature 80, a diameter 90 may be varied so more of the flow of hot gas is affected. For a relatively complex, ramp-shaped performance feature 82, a width 92 may be varied. The ramp-shaped performance feature 82 may be used, for example, to mitigate changes in the initial contour path 66 and the worn contour path 68 upstream of the performance feature 80, 82.

Alternately, or in addition, a contour 94 of the performance feature as seen by the wear instrument may be varied.

For example, as more component material 52 is lost, the contour or a varying contour performance feature 96 may change so that the aerodynamic action imparted by the varying contour performance feature 96 changes. This can be seen in the varying contour performance feature 96 of FIG. 3 whose contour increases in diameter 90 and shape as the component material is lost. Such an increase in the contour's size and shape may be necessary when, for example, the performance feature is locally redirecting airflow over an object that does not wear. The varying contour may be designed to relatively increase the amount local redirection that will be needed as the component material 52 continues to be lost. Any size and shape deemed desirable may be used to achieve the desired aerodynamic action.

Figure 4:
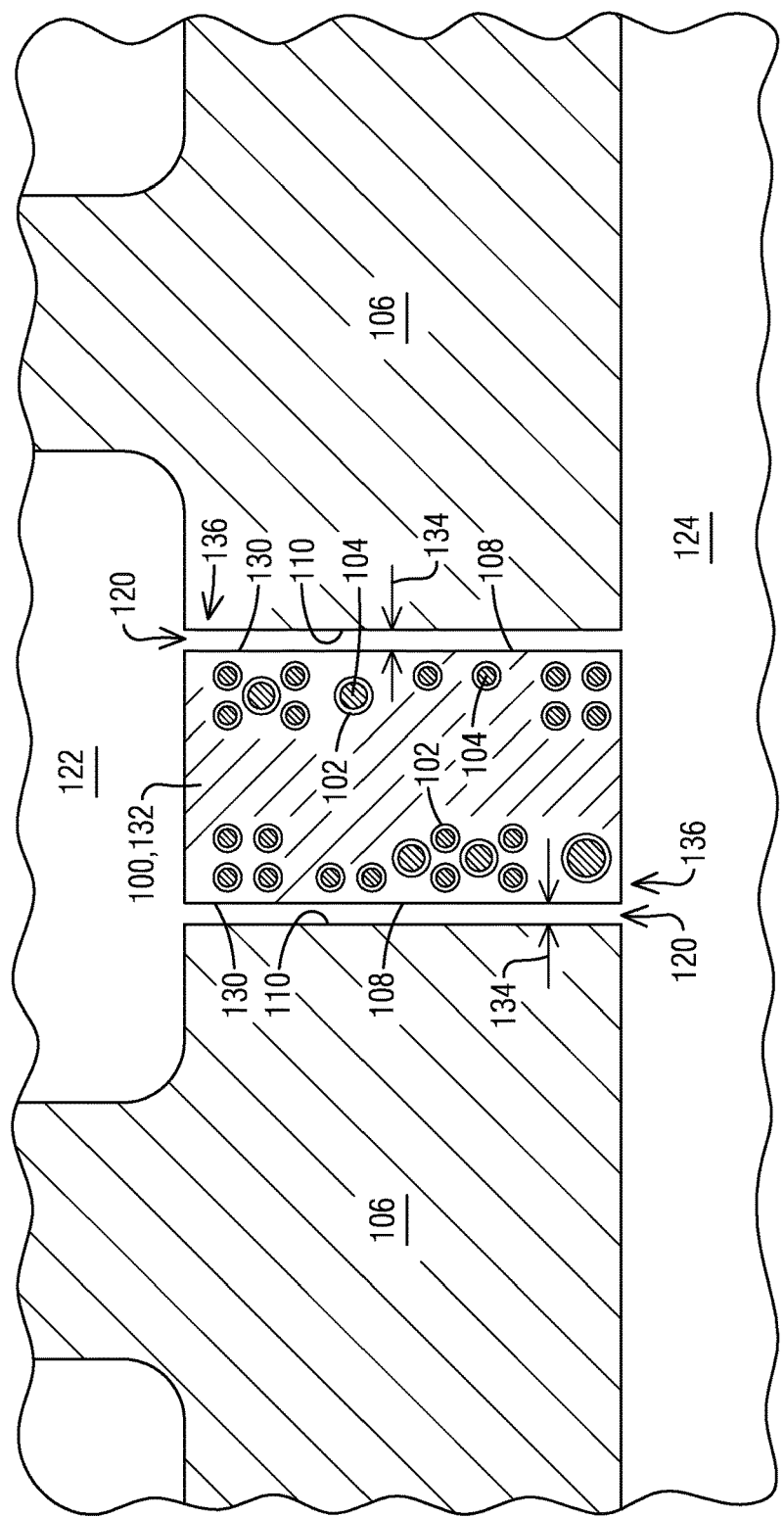
FIG. 4 is a schematic view of an exemplary embodiment of a seal in a gas turbine engine having embedded performance features.

FIG. 4 is a schematic view of an exemplary embodiment of a seal element 100 comprising performance features 102 filled with a flowable material 104. The seal element 100 is disposed between adjacent components which, in this non-limiting exemplary embodiment, are stationary vanes 106. The sealing element includes sealing surfaces 108 that abut (i.e. interact with) an adjacent sealing surface 110 of the stationary vanes 106. Each sealing surface 108 and adjacent sealing surface 110 constitute a seal 120. In this exemplary embodiment the seal 120 keeps hot gases in a hot gas path 122 and keeps the cooling air in a plenum 124 outside the stationary vanes 106.

In this exemplary embodiment the adjacent sealing surface 110 represents a wear instrument by mechanically contacting the sealing surface 108 and causing loss through friction. The hot gases may represent another wear instrument should the hot gases be leaking past the seal 120 sufficiently. Typically, a static pressure in the plenum 124 is greater than in the hot gas path 122. Accordingly, there is commonly an urge for cooling air to flow into the hot gas path 122. Periodically, the static pressure in the hot gas path 122 may be greater than in the plenum 124. As a result, there is periodically an urge for the hot gases to flow into the plenum 124. The seal element 100 with an initial seal contour 130 is intended to prevent these flows.

During operation and over time the seal element 100 may experience a loss of seal element material 132 causing the sealing surface 108 to move. This permits a gap 134 to come into existence, and/or to grow, and this, in turn, permits increased leakage flows. Known markers would indicate this wear and enable an operator to know when to replace the seal element 100. However, the inventors propose to fill these performance features 102 with the flowable material 104 that acts as a sealant.

Once exposed, these performance features 102 will release the sealant which will elevate/spread over the sealing surface 108 and narrow or close the gap 134 created by the loss of the seal element material 132. The sealant may be an epoxy sealant and may be pressurized within a sacrificial polymer shell/casing as is known in the art. A static pressure in the shell may be greater than a static pressure at the sealing surface such that once exposed the shell is breached and the sealant is expelled onto the sealing surface 108. The performance features 102 may be distributed such that more performance features 102 and/or larger performance features 102 are located in known high wear regions 136. The performance features 102 may be located at varying depths so that the sealant is released periodically with further loss, thereby periodically repairing the seal 120.

Figure 5:
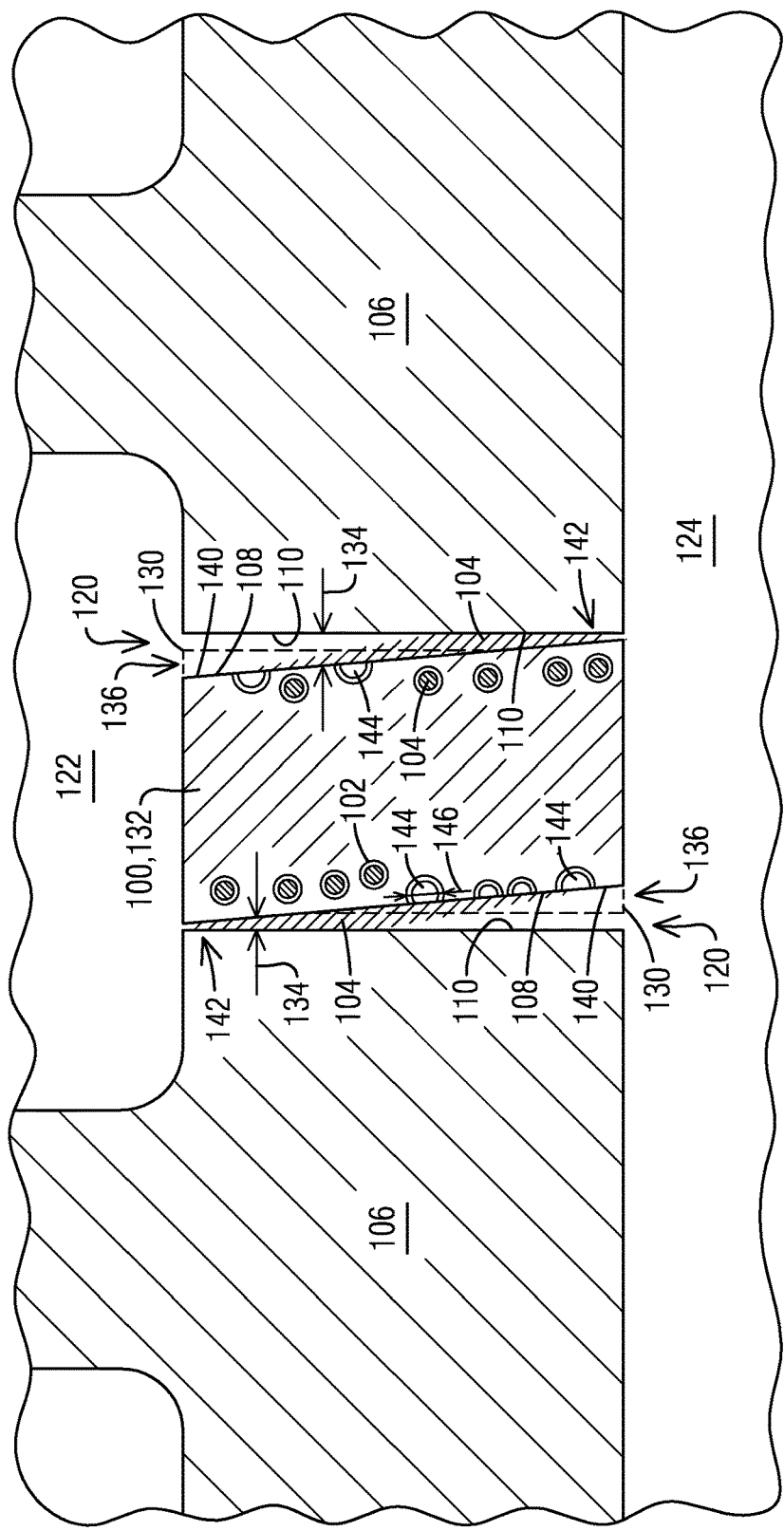
FIG. 5 is a schematic view of the seal of FIG. 4 with the performance features performing a function in response to wear of the seal material.

FIG. 5 shows the seal element 100 after an amount of loss of the seal element material 132, which has moved the sealing surface 108 from the initial seal contour 130 to a worn contour 140. This loss initially increased the gap 134 until the sealing surface 108 reached the shallowest performance feature 102. Once exposed and breached the performance feature 102 released the sealant which flowed onto the sealing surface 108. Depending on the amount of sealant released and the size of the gap 134, the sealant may shrink the gap 134, or it may close the gap 134.

Pressure differentials across the sealing surface 108 may drive the sealant toward a narrowed portion 142 of the gap 134, where the sealant may close the gap 134. This effect is shown in both directions in FIG. 5 to illustrate preventing cooling air from entering the hot gas path 122 (on the left) and to prevent hot gas from entering the plenum 124 (on the right). The breached performance features 102 leave a void 144 having a dimension 146 indicative of the amount of wear while simultaneously mitigating or curing the loss of performance due to the loss of seal element material 132. Since the seal 120 affects engine performance, the performance features 102 mitigate or cure a loss in engine performance caused by the loss of seal element material 132. In the condition shown in FIG. 5 some of the performance features 102 remain intact. Consequently, further loss of seal element material 132 over time may result in subsequent corrective action.

Alternately, or in addition, the flowable material 104 in some of the performance features 102 may be a lubricant. In such a configuration some of the performance features 102 may include the sealant while others include the lubricant. In this configuration, as the sealing surface 108 recedes the sealant and the lubricant may be released sequentially, simultaneously, simultaneously then sequentially, or sequentially and then simultaneously as more wear occurs. For example, the performance features 102 may initially release a lubricant in anticipation of minor initial wear. The performance features 102 that include the sealant may be embedded so that it takes further wear to release the sealant. Such an arrangement may be desirable if there exists an advantage of using one flowable material 104 over another, such as cost etc. Alternately, at least some of the performance features 102 may include a combination of sealant and lubricant. Any composition of the flowable material 104 in any manner of distribution throughout the performance features 102 is envisioned.

FIG. 6 is a schematic sectional view of an exemplary embodiment of a round bearing 150 having embedded performance features 152 embedded such that a top 154 of respective performance features 152 is at a respective distance "d" from a surface 156 of the bearing. In this exemplary embodiment the flowable material 104 may be a lubricant that, by virtue of being embedded at different depths "d", releases over time as wear occurs.

Figure 8:
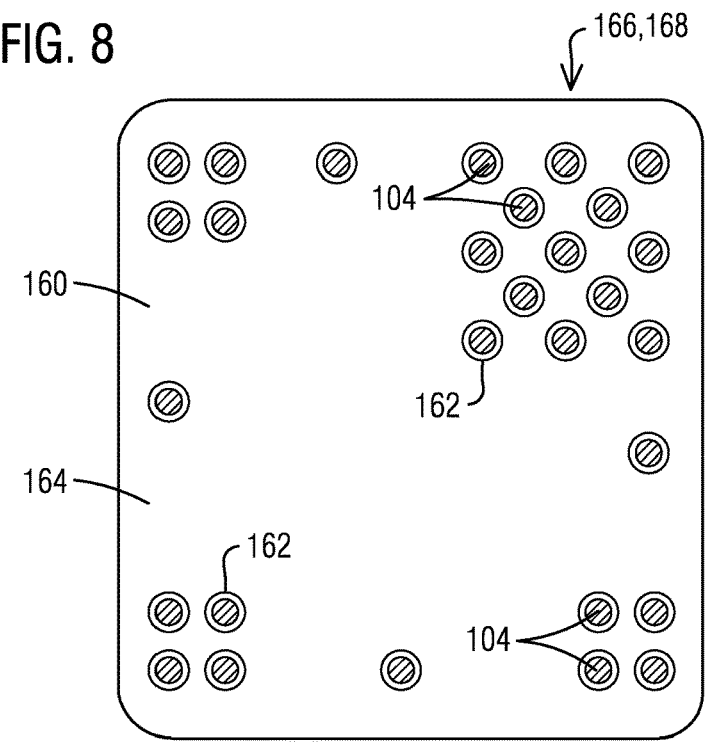
FIG. 8 is a schematic front sectional view of the flat bearing of FIG. 7.

FIG. 7 is a schematic side sectional view of an exemplary embodiment of a flat bearing 160 having embedded performance features 162. Here again the performance features 162 are disposed at various, respective depths "d" from a bearing surface 164. In this exemplary embodiment the flowable material 104 may be a lubricant that, by virtue of being embedded at different depths "d", releases over time as wear occurs. FIG. 8 is a schematic front sectional view of the flat bearing 160 showing a distribution pattern that varies in population density as well as depth. In this exemplary embodiment an area 166 of increased population density coexists with an area 168 where high material loss is anticipated.

Figure 9:
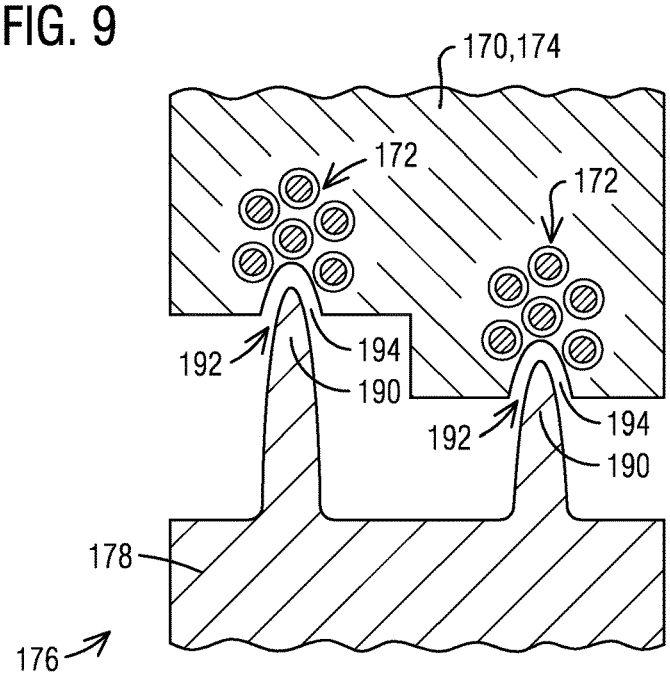
FIG. 9 is a schematic sectional view of an exemplary embodiment of an abradable surface having embedded performance features.

FIG. 9 is a schematic sectional view of an exemplary embodiment of an abradable material 170 having embedded performance features 172. In this exemplary embodiment the abradable material 170 may be part of a blade ring 174 surrounding a stage 176 of rotating blades 178. The abradable material 170 and sealing tips 190 of the rotating blades 178 together form a blade seal 192 there between. Thermal transients cause relative movement between the abradable material 170 and the sealing tips 190. This sometimes causes physical interference between the two, and the abradable material is selected to yield to the sealing tips 190. This prevents damage and maintains the seal 192 as much as possible. The performance features 172 may include the flowable material 104 as a sealant that is similarly selected to yield to the sealing tips 190 and to reduce a gap 194 between the sealing tips 190 and the abradable material 170. This would occur once the performance features 172 are exposed by the interference and the flowable material 104 is released.

Alternately, or in addition, the flowable material 104 in some of the performance features 172 may be a lubricant. In such a configuration some of the performance features 172 may include the sealant while others include the lubricant. In this configuration, the sealant and the lubricant may be released sequentially, simultaneously, simultaneously then sequentially, or sequentially and then simultaneously as more wear occurs. For example, the performance features 102 may initially release a sealant in anticipation of minor initial wear. The performance features 102 that include the lubricant may be embedded so that it takes further wear to release the lubricant. Such an arrangement may be desirable if the lubricant's cooling effect during abrasion between the abradable material 170 and the sealing tips 190 is more advantageous than the sealing effect. Alternately, or in addition, at least some of the performance features 172 may include a combination of sealant and lubricant. Any composition of the flowable material 104 in any manner of distribution throughout the performance features 172 is envisioned.

The performance features may be formed as part of the component or may be added afterward. For example, the component may be cast around the performance features. Alternately, the performance feature may be added as part of an additive manufacturing process such as that disclosed in U.S. Publication Number 2013/0136868 to Bruck et al., published on May 30, 2013, which is incorporated herein by reference in its entirety. In this process a second powder material may be used to form the performance feature within a first powder, where the first powder constitutes the component material subject to loss. In yet another exemplary embodiment the performance features may be installed in a recess in the component, such as by brazing and/or welding etc. The performance feature may be long enough such that a bottom of the performance feature is located away from the relatively hostile environment of, for example, the hot gases. In such an embodiment a bond might suffice that might not suffice if exposed to the harsh operating environment of the exposed end of the performance feature. Alternately, or in addition, the performance feature may be secured at the bottom end by a fastener. In addition, the performance feature can be formed as part of a newly manufactured component, or it can be added to an engine-run component as part of a retrofit and/or repair operation.

Figure 10:
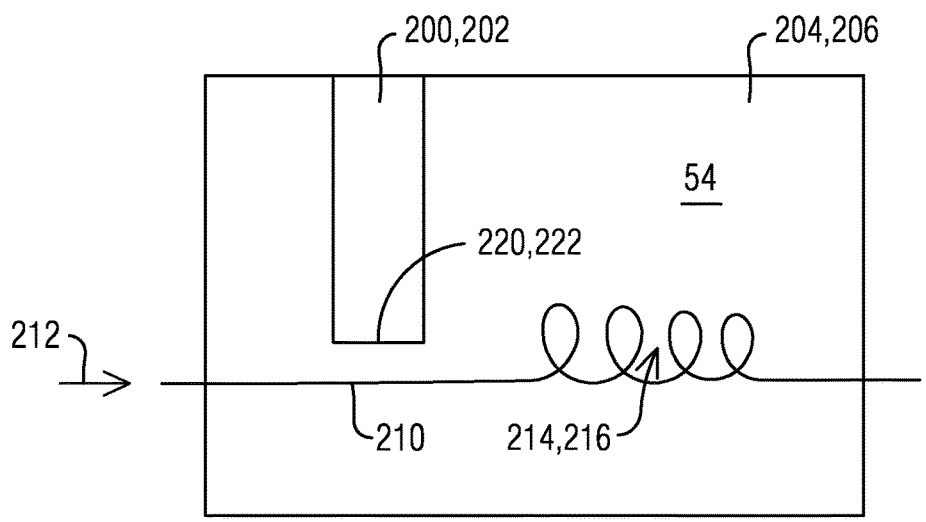
FIG. 10-11 are schematic top views of an alternate exemplary embodiment of a performance feature moving an interaction location as both the component material and the performance feature material wear.
Figure 11:
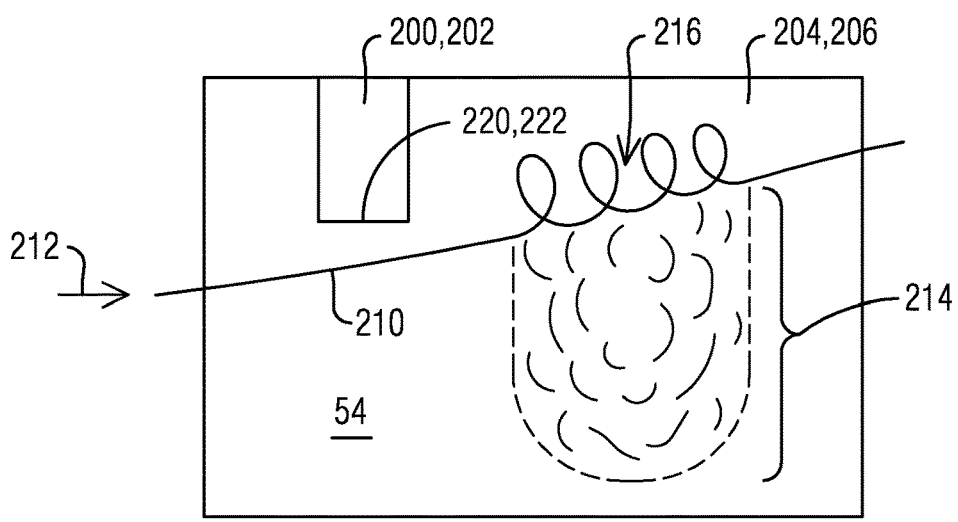

FIGS. 10-11 are schematic top views of an alternate exemplary embodiment where a performance feature 200 includes a performance feature material 202 that is also subject to wear. The performance feature material 202 may be relatively more wear resistant, relatively less resistant, or similarly wear resistant as a component material 204 of the component 206. In this exemplary embodiment the wear instrument may be a gas flow 210 flowing in a flow direction 212. As the gas flow 210 flows past the performance feature 200 and across the surface 54 the gas flow 210 interacts with the surface 54 causing wear/erosion 214. This wearing initially occurs at an interaction location 216. A limited amount of wear/erosion 214 in any particular location may be acceptable. To prevent too much wear 214 in the particular location it may be desired to change where the gas flow 210 interacts with the surface 54 over time. In an exemplary embodiment where the performance feature 200 controls the interaction location 216, the performance feature 200 itself can be made to wear in a controlled manner that causes the interaction location 216 to move as the performance feature 200 wears.

In the exemplary embodiment of FIGS. 10-11, a location 220 of an end 222 of the performance feature 200 controls the interaction location 216. FIG. 10 shows the performance feature 200 and the interaction location 216 at a point earlier in time, while FIG. 11 shows the performance feature 200 and the interaction location 216 at a later point in time. Accordingly, as can be seen in FIG. 11, as the location 220 of the end 222 of the performance feature 200 moves over time, so does the interaction location 216. Moving the interaction location 216 spreads the wear 214 across the surface 54 of the component 206, thereby preventing too much wear 214 (e.g. wear that is too deep) in a particular location.

Figure 12:
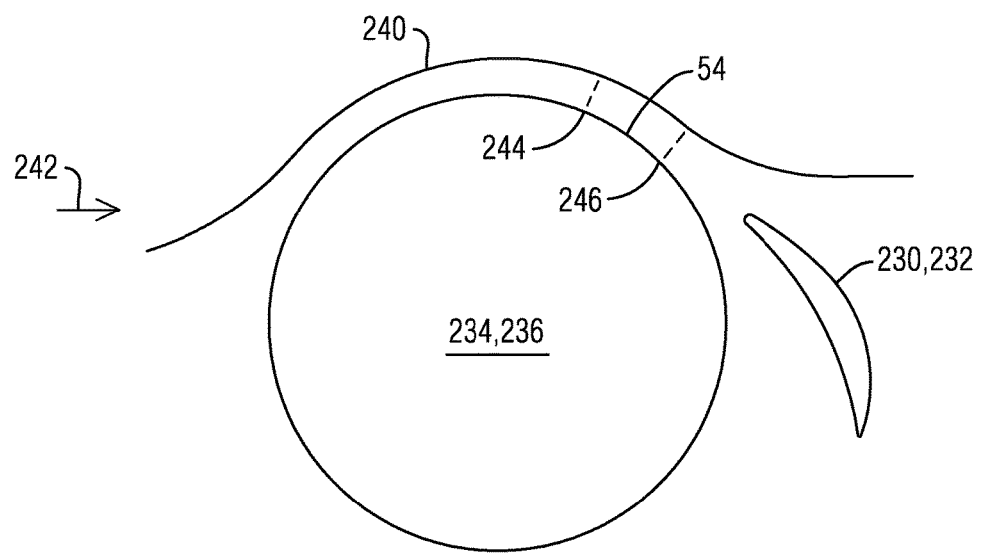
FIGS. 12-13 are schematic side views of an alternate exemplary embodiment of a performance feature maintaining an interaction location as both the component material and the performance feature material wear.
Figure 13:
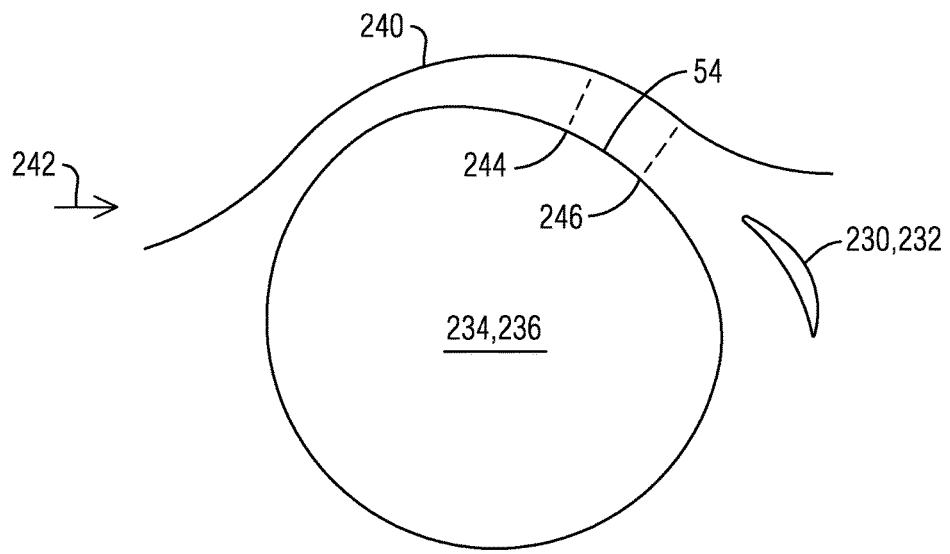

FIGS. 12-13 are schematic representations of an alternate exemplary embodiment where a performance feature 230 includes a performance feature material 232 that is also subject to wear. The performance feature material 232 may be relatively more wear resistant, relatively less resistant, or similarly wear resistant as a component material 234 of the component 236. In this exemplary embodiment the performance feature 230 is set apart from the surface 54 of the component 236 and the wear instrument may be a gas flow 240 flowing in a flow direction 242.

In this exemplary embodiment, if the performance feature 230 were not present, the gas flow 240 would separate from the component 236 at an unadjusted separation location 244 and would have a different contour. To control and/or maintain a desired contour of the gas flow 240, the performance feature 230 is aerodynamically shaped to pull on the gas flow 240 so that the gas flow 240 adheres to the surface 54 of the component farther downstream. Being drawn to the surface 54 by the performance feature 230 causes the gas flow 240 to separate from the surface 54 at an adjusted separation location 246 during operation, and this results in the desired contour of the gas flow 240 shown.

As the surface 54 wears, a contour of the surface 54 may change shape. If the performance feature 230 were not present, the changing shape of the surface 54 may cause the flow to naturally separate from the surface 54 farther downstream over time, and this would cause a change in the contour of the gas flow 240 over that time. In the arrangement shown, initially the adjusted separation location 246 is determined primarily by the performance feature 230 and secondarily by the contour of the surface 54. Over time this changes such that the adjusted separation location 246 is determined primarily by the contour of the surface 54 and secondarily by the performance feature 230. The change is brought about by a wearing of both the surface 54, and the performance feature 230 and the changing influence each has on the gas flow 240. To achieve this, the performance feature 230 may be intentionally designed to wear as the surface 54 wears so that its influence decreases over time. Together the combined and changing influences of the contour of the surface 54 and the performance feature 230 are designed to cause the flow to separate at the adjusted separation location(s) 246 as wear occurs, and this controls and/or maintains the desired contour of the gas flow 240 regardless of the state of wear of the component 236.

FIG. 12 shows the contour of the surface 54 and the performance feature 230 initially, and the desired contour of the gas flow 240. FIG. 13 shows the worn contour of the surface 54, the worn performance feature 230, and the adjusted separation location 246 at a point later in time. Note that the adjusted separation location 246 may change over time in order to maintain the desired contour of the gas flow 240. FIG. 13 also shows the desired contour of the gas flow 240, which has not changed despite the wear. It can be seen by its reduced size that over time the performance feature 230 wears and consequently has an ever-reducing influence on the gas flow 240. The shape and relative wear rate of the performance feature 230 can be designed to control the adjusted separation point 244 and therefore to control and/or maintain the desired contour of the gas flow 240 throughout the entire life of the component. Alternately, the desired contour of the gas flow 240 can be maintained in one location for a portion of the life, and moved to another location during another portion of the life.

From the foregoing it can be seen that the inventors have improved upon conventional markers by giving them the additional role of at least reducing a rate of change of a function served by the material whose loss the marker is indicating. In some exemplary embodiments the performance indicators can improve or cure the changing function, and in some exemplary embodiments the performance indicators can even do so repeatedly over time. Consequently, this represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A gas turbine engine component, comprising:
   a surface subject to loss caused by a wear instrument during operation of the component in a gas turbine engine; and
   a performance feature associated with the surface, wherein before any loss the performance feature is disposed on the surface;
   wherein the surface and the performance feature interact in a manner that changes with the loss such that a change in performance of the gas turbine engine resulting from the loss is mitigated, wherein the performance feature includes a contour as encountered by the wear instrument, and wherein the contour changes with further loss, and
   further comprising a plurality of said performance features disposed on the surface and distributed in a pattern that varies in at least one of population density and diameter of the performance features.

2. The gas turbine engine component of claim 1, wherein the component comprises a component material, and wherein the performance features comprise a performance feature material that is less susceptible to loss due to the wear instrument than the component material.

3. The gas turbine engine component of claim 2, wherein the wear instrument comprises a flow of hot gases and the interaction comprises anchoring a separation location where the flow of hot gases separates from the gas turbine engine component.

4. The gas turbine engine component of claim 2, wherein the wear instrument comprises a flow of hot gases and the interaction comprises defining a location where vortices form in the flow of hot gases.

5. The gas turbine engine component of claim 1, wherein the component comprises a component material, wherein the performance features comprise a performance feature material that is subject to wear, wherein the wear instrument comprises a flow of hot gases and the interaction comprises anchoring a separation location where the flow of hot gases separates from the gas turbine engine component.

6. A gas turbine engine component, comprising:
   a component material subject to loss during operation caused by a wear instrument, the component material comprising a substrate surface;
   a performance feature at least partially embedded in the component material to become more exposed upon the loss,
   wherein the gas turbine engine component and the wear instrument together perform a function;
   wherein, before the loss, the function occurs via the substrate surface and at the substrate surface,
   wherein, after the loss, the function occurs via the performance feature and at a location above the substrate surface,
   wherein the performance feature comprises a material less susceptible to the loss due to the wear instrument than the component material and which protrudes from the substrate surface upon the loss, and
   wherein the wear instrument comprises a flow of hot gases and the function comprises creating an aerodynamic action in the flow of hot gases, wherein the aerodynamic action comprises anchoring a separation location in the flow of hot gases.

7. The gas turbine engine component of claim 6, further comprising a plurality of said performance features distributed in a pattern varying in at least one of population density, depth within the component material of a top of the performance features, and diameter of the performance features.

8. The gas turbine engine component of claim 6, wherein the aerodynamic action further comprises at least one of anchoring a location of vortex formation in the flow of hot gases and locally redirecting the flow of hot gases.

* * * * *